Figure 1:
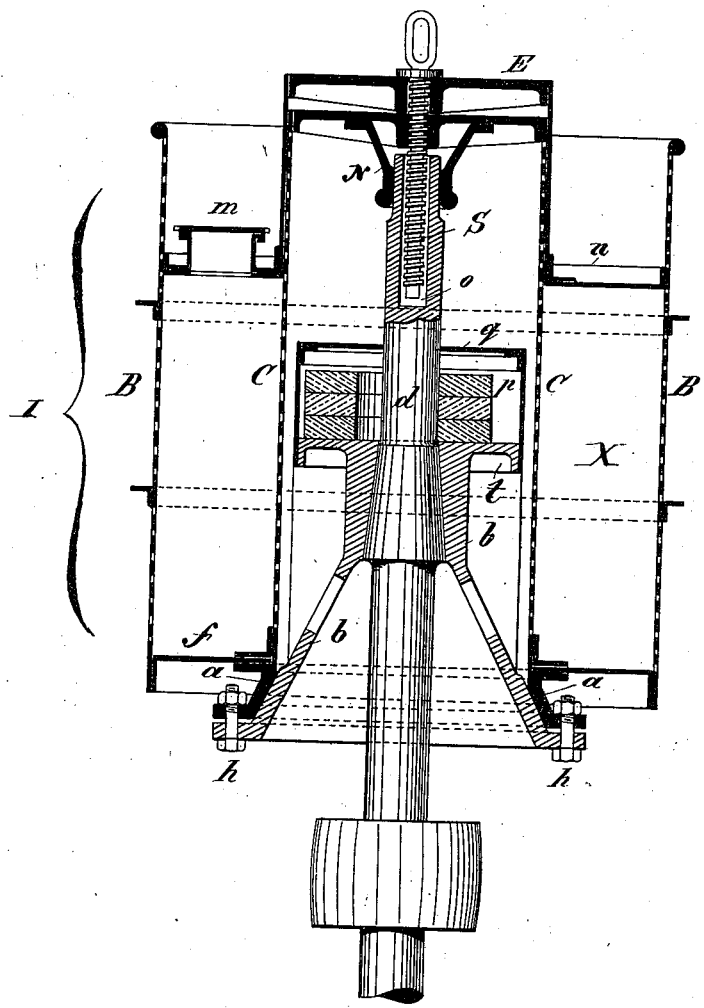

(No Model.)  2 Sheets—Sheet 1.

J. O. OBERMAIER.
CENTRIFUGAL MACHINE FOR TREATING TEXTILE FABRICS, &c.

No. 329,204. Patented Oct. 27, 1885.

Witnesses:

J. Otto Obermaier,
Inventor:

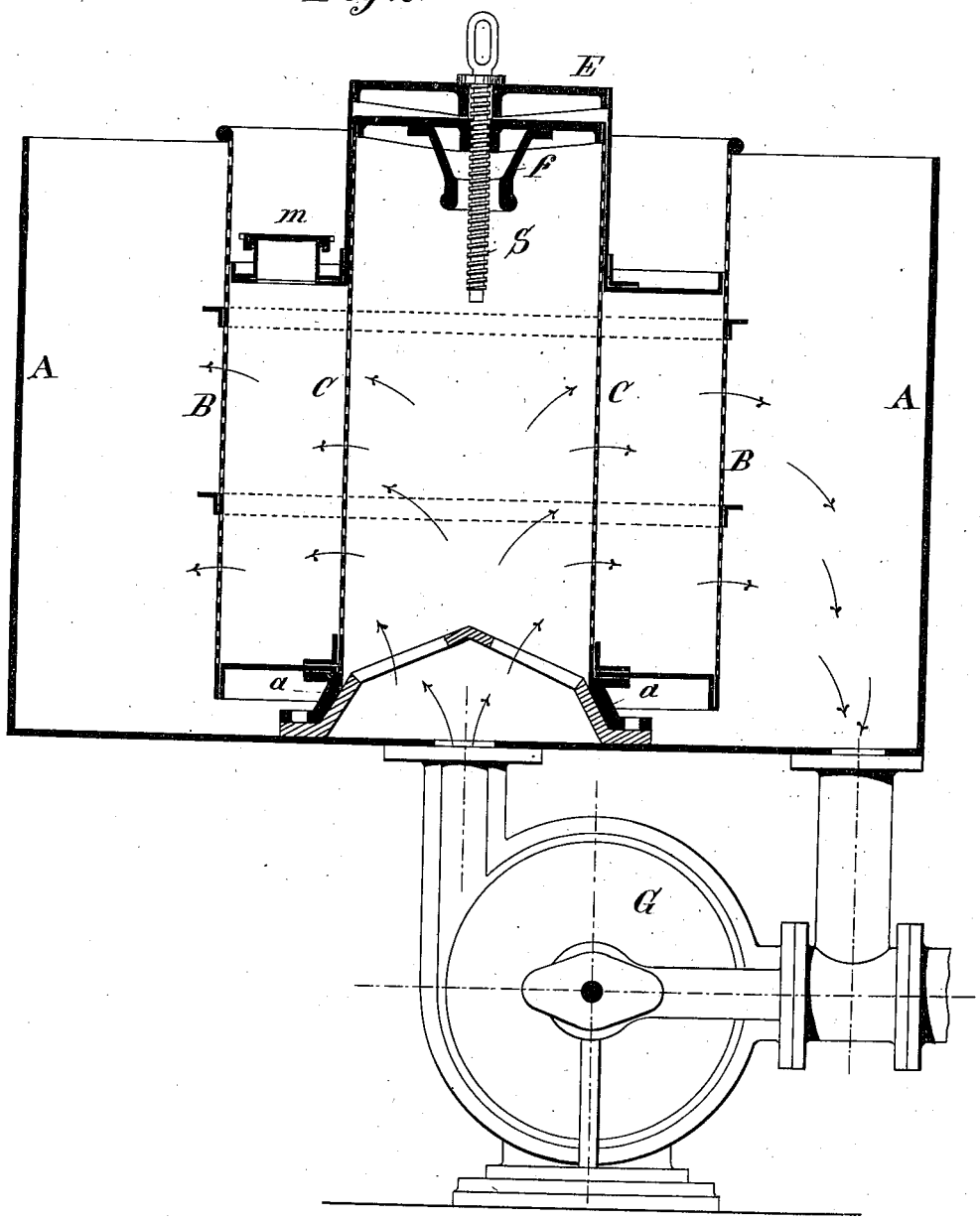

UNITED STATES PATENT OFFICE.

JULIUS OTTO OBERMAIER, OF LAMBRECHT, BAVARIA, GERMANY.

CENTRIFUGAL MACHINE FOR TREATING TEXTILE FABRICS, &c.

SPECIFICATION forming part of Letters Patent No. 329,204, dated October 27, 1885.

Application filed June 25, 1885. Serial No. 169,798. (No model.)

*To all whom it may concern:*

Be it known that I, JULIUS OTTO OBERMAIER, a subject of the King of Bavaria, residing at Lambrecht, in the Kingdom of Bavaria, German Empire, have invented new and useful Improvements in Centrifugal Machines for Treating Textile Fibers, Webs, and other Textile Materials by Liquors or Gases, of which the following is a specification.

My invention has for its object to avoid the loss of time and expense and labor of removing the materials to be dyed from the vessel containing them in order to extract the dye-liquor prior to changing from one dye-vessel to another; and my invention consists in subjecting the vessel and its contents to a rapid rotation to remove the surplus liquor after the removal of the vessel from one vat and prior to placing it in another, and in constructing the vessel and a centrifugal machine so that such rapid revolution can be secured by placing the vessel on the shaft of the machine.

My invention further consists in means for counterbalancing the vessel when it is so loaded as to be weighted more at one side than the other.

In the drawings, Figure 1 is a sectional elevation showing the improved vessel and sufficient of a centrifugal machine to illustrate my improvements. Fig. 2 is a sectional elevation showing the vessel applied to one of the dye-tanks.

In operating according to other methods and with ordinary apparatus it has heretofore been necessary to remove the fibers, yarns, or textile fabrics from the dyeing-vessel before this was taken from one dye-vat to another, in order to remove from the fibers, &c., by centrifugal action or pressure the superfluous dye-stuff contained therein, after which the materials were again placed in the vessel and submitted to the further dyeing process. By this means much time was lost, and frequently a uniform treatment of the material was not obtained.

The present invention relates to an improved construction of apparatus whereby this disadvantage is obviated, the dyeing-vessel being so constructed that it can be placed upon a centrifugal machine for removing the surplus liquid by centrifugal action.

The construction of the vessel I for this purpose is shown on the accompanying drawings. There is an inner perforated cylinder, C, and an outer perforated cylinder, B, a bottom, $f$, connecting the two to form an intermediate annular chamber, X, and a conical flanged ring, $a$, adapted to the cone $b$ of a centrifugal machine, secured to the bottom, and a cap, E, carries an annular follower, $n$, between which and the bottom $f$ the material to be dyed is confined. By means of the ring $a$ the dyeing-vessel B can be fitted onto the cone $b$ of the centrifugal machine, where it may or may not be secured by means of screw-bolts. In order to support the receptacle at its upper end also, the cover E is provided with a socketed nipple, N, into which fits the upper end of the shaft $d$ of the centrifugal machine. The screw S of the cover is made to fit into a recess, $o$, formed for it in the shaft $d$. By this means the receptacle can be quickly applied to the shaft $d$, revolved rapidly, and the contents can be readily cleared of superfluous liquid after removing the same from one dye-vat and prior to placing it into another in the position shown in Fig. 2, when the gas or the dye-liquor is forced through the casings and intervening material by a circulating-pump, G.

In order to establish a perfect balance of the receptacle upon the shaft $d$, the latter is provided with a flange, $t$, supporting loose metal rings $p$, which, on rotary motion being imparted to the apparatus, automatically adjust themselves in position so as to establish the desired balance. This means of securing an accurate balance may be used with the revolving shafts of other apparatus.

I claim—

1. The improvement in treating fibers, &c., for dyeing the same, consisting in confining them in a perforated vessel, transferring said vessel from one vat to another, and after removal from each vat revolving said vessel to remove the surplus liquor, substantially as described.

2. The combination, with the vessel having inner and outer connected perforated casings, of a ring adapted to a bearing on the shaft of a centrifugal machine, to permit the ready application of the receptacle thereto, substantially as described.

3. The combination of the vessel I, ring $a$, cap E, screw S, and shaft $d$ of a centrifugal machine provided with a bearing for the ring $a$, and with a recess, $o$, for the screw S, substantially as described.

4. The combination of the vessel I, ring $a$, cap E, screw S, and socketed nipple N, substantially as described.

5. The combination of the shaft $d$, flange $t$, and loose rings $p$, substantially as and for the purpose set forth.

6. The combination, with the shaft $d$ of a centrifugal machine, and vessel I, adapted to be readily applied to and removed from the shaft, of a flange on the shaft and loose rings supported by the flange, substantially as described.

In testimony whereof I have signed my name to this specification in the presence of two subscribing witnesses.

JULIUS OTTO OBERMAIER.

Witnesses:
B. ROI,
O. WICHMANN.